United States Patent [19]

Hosono

[11] Patent Number: 5,856,930
[45] Date of Patent: *Jan. 5, 1999

[54] DISC-SHAPED RECORDING MEDIUM, DISC RECORDING APPARATUS AND DISC REPRODUCING APPARATUS

[75] Inventor: Yoshimasa Hosono, Kanagawa, Japan

[73] Assignee: Sony Corporation, Tokyo, Japan

[ * ] Notice: The terminal 24 months of this patent has been disclaimed.

[21] Appl. No.: 335,781

[22] PCT Filed: Mar. 28, 1994

[86] PCT No.: PCT/JP94/00497

§ 371 Date: Nov. 14, 1994

§ 102(e) Date: Nov. 14, 1994

[87] PCT Pub. No.: WO94/23428

PCT Pub. Date: Oct. 13, 1994

[30] Foreign Application Priority Data

Mar. 26, 1993 [JP] Japan ................................. 5-091961

[51] Int. Cl.$^6$ ................................................. H04L 05/00
[52] U.S. Cl. ........................................ 364/514 A; 348/396
[58] Field of Search ........................... 364/514 C, 514 A; 369/48; 348/396; 395/888

[56] References Cited

U.S. PATENT DOCUMENTS

| 4,918,523 | 4/1990 | Simon et al. | 348/396 |
| 5,237,675 | 8/1993 | Hannon, Jr. | 395/888 |
| 5,243,587 | 9/1993 | Itoh et al. | 369/48 |

FOREIGN PATENT DOCUMENTS

| 0 456 433 A2 | 11/1991 | European Pat. Off. . |
| 2-72780 | 3/1990 | Japan . |

OTHER PUBLICATIONS

Yasuda, Hiroshi, "International Standard of Multi–Media Coding", *Maruzen*, pp. 127–132.

Herpel et al., "Video Coding for Recording on a CD–like Magno–Optical Disc", *IEEE 1990, International Conference on Consumer Electronics, Digest of Technical Paters*, Jun. 1990, pp. 46–47, XP169759.

*Primary Examiner*—Ellis B. Ramirez
*Assistant Examiner*—Thomas Peeso
*Attorney, Agent, or Firm*—William S. Frommer; Alvin Sinderbrand

[57] ABSTRACT

According to the present invention, when image data high-efficiency-coded based on the MPEG standard or the like is clustered at every sector of a predetermined number, a link sector is provided at a connected portion of each cluster and the image data is interleaved and recorded on a mini disc, the image data is recorded on each cluster at the unit of 1GOP. When the mini disc is a preformatted one and a P picture or B picture exists at the starting portion of the cluster, a picture which becomes a predictive standard is encoded as an I picture and recorded on the link sector of the immediately-preceding cluster independently of an original P picture. Upon decoding, when the I picture was not recorded on the link sector of the immediately-preceding cluster, the P picture or the B picture recorded at the starting portion of the cluster is inhibited from substantially being decoded. Thus, when the high-efficiency-coded image data is recorded on the disc-shaped recording medium, such as the mini disc or the like, an edit processing based on the unit of GOP becomes possible by a simple and rapid processing. Also, a special reproduction, such as a fast forward and a reverse reproduction based on the unit of GOP becomes possible by a simple and rapid processing.

7 Claims, 14 Drawing Sheets

Arrangement of Frame Data in 1GOP

DISC-SHAPED RECORDING MEDIUM, DISC RECORDING APPARATUS AND DISC REPRODUCING APPARATUS

BACKGROUND OF THE INVENTION

The present invention relates to a disc-shaped recording medium for use in recording high-efficiency coded digital image data and a disc recording apparatus and a disc reproducing apparatus for use in recording and reproducing the high-efficiency coded digital image data on and from the disc-shaped recording medium.

As is well known, a CD-ROM (Compact Disc Read Only Memory) is standardized based on a music CD (Compact Disc Digital Audio: hereinafter simply abbreviated as CD-DA).

Initially, a physical format thereof will be described briefly. The physical format is the format in which data can be read out from the CD-ROM disc when such disc is loaded onto a CD-ROM drive.

One disc can include music tracks or data tracks of 99 tracks at maximum. Information concerning such tracks are recorded on the disc at its starting portion called a TOC (Table of Contents), i.e., at the innermost peripheral portion of the disc. A portion in which the TOC is recorded is referred to as a leading track (leading Track). On the other hand, the portion in which a piece of last music is recorded on the CD-DA is referred to as a leadout track (Leadout Track).

In the CD-DA, a stereo audio signal is converted into digital audio signal at a sampling rate of 16 bits and 44.1 kHz and recorded, data of 2 (stereo)×2 (16 bits)×44.100= 176,400 bytes is recorded per second. In the CD-ROM, a sector which results from dividing one second equally by 75 is handled as a minimum unit and therefore one sector is formed of 2,352 bytes.

In the case of CD-ROM MODE-1, one sector includes SYNC data (12 bytes), header (4 bytes), ECC (Error Collection Coding: 276 bytes) for error-correction, EDC (Error Detect Coding: 4 bytes) or the like and therefore remaining 2048 bytes are recorded as user data. ECC and EDC are omitted from the data, such as audio and image data, which need not be strictly error-corrected by data interpolation processing or the like, and 2,336 bytes except SYNC and header are recorded in one sector as user data. This is referred to as CD-ROM MODE-2.

Recently, personal audio equipment called mini disc (trademark) that can be recorded and reproduced have been developed and are now commercially available on the market.

The mini disc employs an EFM (Eight to Fourteen Modulation) as a disc writing modulation system and CIRC (Cross Interleave Reed-Solomon Code) as an error correction code. Audio data compressed according to an ATRAC (Adaptive Transform Acoustic Coding) system is recorded in accordance with this format. Compressed data is recorded at every block called a cluster as shown in FIG. 6. This is a format very close to the above-mentioned CD-ROM MODE 2.

The CD-ROM uses 98 frames of CD as one sector. This is equivalent to a playback time of 13.3 ms. A CIRC interleave length is 108 frames (14.5 ms) and is longer than one sector of the CD-ROM. When data is recorded by using the CIRC error correction code, it is necessary to secure at least 3 extra sectors. This area is referred to as a link area. It is necessary to maintain a link area of 108 frames (1 sector+$\alpha$) before data starts being written. After data was written, it is necessary to maintain the area of 108 frames similarly, otherwise the error correction interleaving is not completed.

If data is written from an arbitrary position, then the link area is dispersed into respective portions of the disc with the result that efficiency with which data is recorded and reproduced is deteriorated. Therefore, data is written at every recording unit of a certain magnitude. This recording unit is referred to as a cluster in the mini disc. One cluster is formed of 36 sectors. This rewriting is constantly carried out at the unit of an integral multiple of one cluster. Data to be recorded is temporarily stored in a RAM and then written in the disc. This RAM can be used commonly as a shock-proof memory that can realize a shock-proof function when used upon reproduction.

In the magneto-optical disc type mini disc that can be recorded and reproduced, 3 sectors of one cluster (=36 sectors) are maintained as a link sector and the next 1 sector is maintained as a sub-data sector. Compressed data is recorded on the remaining 32 sectors.

When data is recorded, data starts being written from about the 2nd link sector of the preceding cluster. When the writing of data on the 36th sector is finished, error correction data has to be written into the starting link sector and the 2nd link sector.

In the mini disc that is similar to the preformatted CD, data need not be rewritten at the unit of clusters and data is recorded successively so that 3 sectors on the link area need not be provided. Therefore 4 sectors (3 link sectors and 1 sub-data sector) are all assigned to sub-data in which graphics data or the like can be stored.

As described above, in the mini disc, the recording disc and the preformatted disc differ from each other in sub-data capacity so that, if sub-data is included, then it is not possible to copy data from the preformatted disc to the recording disc completely.

When a part of previously-recorded data is rewritten in the recording disc, if data to be updated is of very small amount, the whole of the cluster should be rewritten because data are interleaved at the unit of clusters.

On the other hand, an image signal high-efficiency coding system for digital storage media is standardized according to the MPEG1 (Moving Picture Image Coding Experts Group Phase 1) standard. Storage media that are an object of this system are media whose successive transfer rate is 1.5 Mbit/sec or smaller, such as CD, DAT (digital audio tape), hard disk or the like. Moreover, the storage media not only are connected to a decoder directly but also are assumed to be connected to the decoder through transmission media, such as a computer bus, a LAN (local area network) and telecommunication system. Further, the storage media can be not only played back in the forward direction but also played back in some special way, such as random access, high speed playback and reverse direction playback.

A principle of image signal high-efficiency coding system based on the MPEG1 is as follows.

In accordance with the high-efficiency coding system, redundancy in the timebase direction is reduced by calculating differences between image signals, whereafter redundancy in the timebase direction is reduced by using discrete cosine transform (DCT) and variable length coding.

Redundancy in the timebase direction will be described below.

It is customary that preceding and succeeding images and a target image (image at a certain time) of a continuous moving picture are very similar to each other. Therefore, as shown in FIG. 16, for example, if difference between an image to be coded and a preceding or succeeding image is calculated and a resultant difference is transmitted, then it becomes possible to reduce an amount of transmitted information by reducing redundancy in the timebase direction. The image thus coded is referred to as a predictive-coded picture (Predictive-coded picture, P picture or P frame) which will be described later on. Similarly, if the difference between an image to be coded and a preceding or succeeding image or an interpolated image generated from the preceding and succeeding images is calculated and a resultant small difference is transmitted, then it becomes possible to reduce an amount of transmitted information by reducing redundancy in the timebase direction. The image thus coded is referred to as a bidirectionally predictive-coded picture (Bidirectionally Predictive-coded picture, B picture or B frame) which will be described later on. In FIG. 16, an image represented by reference symbol I represents an intra-coded picture (Intra-coded picture, I picture or I frame) which will be described later on. An image represented by reference symbol P in the figure represents the P picture, and an image represented by reference symbol B represents the B picture.

Motion compensation is carried out in order to generate a predictive image.

According to the motion compensation, a block (referred to hereinafter as a macroblock) of 16×16 pixels composed of a unit block of 8×8 pixels, for example, is extracted and a macroblock with a smallest difference is searched from the position near the position of a macroblock corresponding to the preceding image. Then, it is possible to reduce an amount of transmitted data by calculating difference between the extracted macroblock and the searched macroblock. In actual practice, it is possible to code the P picture (predictive-coded picture) by selecting images with small data amounts at the macroblock unit of 16×16 pixels from image whose difference relative to the motion-compensated predictive image is calculated and image whose difference relative to the motion-compensated predictive image is not calculated.

However, in the above-mentioned case, large data amount have to be transmitted with respect to an image portion, such as background or the like which can be exposed after an object was moved. Therefore, in the B picture (bidirectionally predictive-coded picture), data of decoded forward or backward image whose motion was compensated from a time standpoint, a difference between an interpolated image generated by adding the preceding two images and an image to be coded and an image having no difference, i.e., an image to be coded, is calculated and the result with the smallest data amount is coded.

Redundancy in the spatial axis direction will be described below.

Difference of image data is not transmitted as it is but processed at every unit block of 8×8 pixels by discrete cosine transform (DCT). The DCT expresses an image not by the pixel level but by an amount of frequency component of cosine function. By 2-dimensional DCT, for example, data of the unit block of 8×8 pixels is converted to coefficient block of 8×8 cosine function components. In general, it is frequently observed that an image signal representing a natural picture obtained by a television camera becomes a smooth signal. In this case, it is possible to efficiently reduce data amount by processing the image signal by DCT.

Specifically, if the smooth signal, such as the image signal representing the natural picture, is processed by DCT, then a large value is concentrated near a particular coefficient. If this coefficient is quantized, then almost all of the 8×8 coefficient blocks become zero and only a large coefficient remains.

Thus, when data of 8×8 coefficient blocks is transmitted, if such data is transmitted in the form of a Huffman code composed of a set of non-zero coefficients and a 0-run representing the number of 0s provided ahead of a non-zero coefficient in a zig-zag scanning fashion, then it becomes possible to reduce a transmission amount. The decoding side rearranges an image in the opposite procedure.

A structure of data that the above-mentioned coding system handles is illustrated in FIG. 17. The data structure shown in FIG. 17 is composed of a block layer, a macroblock layer, a slice layer, a picture layer, a group of picture (GOP: Group Of Picture) layer and a video sequence layer, in that order from below. This data structure will be described sequentially from the bottom layer in FIG. 17.

Initially, in the block layer, each unit block of the block layer is composed of 8×8 pixels (pixels of 8 lines and 8 pixels) of luminance or adjacent color difference blocks. Each unit block is processed by the above-mentioned DCT.

In the macroblock layer, each macroblock is composed of 6 blocks, 4 luminance blocks (luminance unit blocks) Y0, Y1, Y2, Y3 adjoining in the left and right and upper and lower directions and 2 color difference blocks (color difference unit blocks) Cr, Cb which are equivalent at the same positions as those of the luminance blocks. These blocks are transmitted in the order of Y0, Y1, Y2, Y3, Cr and Cb. In this coding system, a type of predictive image (reference image from which a difference is calculated) and transmission of the difference are judged at the macroblock unit.

The slice layer is composed of one or a plurality of macroblocks connected in the scanning order of images. In the header of the slice layer, a difference between a motion vector and a DC (direct current) component within an image is reset and the first macroblock includes data representing the position within the image. Thus, when an error occurs, the slice layer can be restored. For this reason, the length and the starting position of the slice layer are made arbitrary and can be varied depending on the error state on a transmission line.

In the picture layer, a picture, i.e., each image is composed of one or a plurality of slice layers. In accordance with the coding system, the slice layers are classified as four kinds of images of the intra-coded picture (I picture or I frame), the predictive-coded pictures (P picture and B frame) and the DC intra-coded picture (DC coded (D) picture).

In the intra-coded picture (I picture), upon coding, only closed information in one picture is used. Accordingly, in other words, upon decoding, a picture can be reconstructed by only information of the I picture. In actual practice, a difference is not calculated and image data is processed by DCT and coded. Although this coding system is generally low in efficiency, if the I picture is inserted everywhere, then it becomes possible to carry out random access and high-speed reproduction.

In the forward predictive-coded picture (P picture), I picture or P picture located at the advanced position from a time standpoint and which was already decoded is utilized as a predictive picture (picture which becomes a reference to calculate a difference). In actual practice, a more efficient method of coding a difference of a motion-compensated predictive picture and a method of (intra-) coding a predictive picture without calculating a difference is selected at the unit of macroblock.

In the bidirectionally predictive-coded picture (B picture), there are used three kinds of pictures of I picture or P picture located at the advanced position as the predictive picture from a time standpoint, which are already decoded, and an interpolated picture generated from the aforementioned two pictures. Thus, the most efficient method of coding a difference between the motion-compensated three kinds of pictures and the intra-coding method can be selected at the unit of macroblock.

The DC intra-coded picture is an intra-coded picture formed of only a DC coefficient of the DCT and cannot exist on the same sequence as those of the other three kinds of pictures.

The above-mentioned group of picture (GOP) layer is composed of one or a plurality of I pictures and 0 or a plurality of non-I pictures.

When the input order to the encoder is set to 1I, 2B, 3B, 4P*5B, 6B, 7I, 8B, 9B, 10I, 11B, 12B, 13P, 14B, 15B, 16P*17B, 18B, 19I, 20B, 21B, 22P, the sequential order of the output from the encoder, i.e., input to the decoder, is set to 1I, 4P, 2B, 3B*7I, 5B, 6B, 10I, 8B, 9B, 13P, 11B, 12B, 16P, 14B, 15B*19I, 17B, 18B, 22P, 20B, 21B, for example.

The reason that the sequential order is replaced in the encoder is that, when the B picture, for example, is coded or decoded, the delayed I picture or P picture which becomes a predictive picture from a time standpoint should be coded previously. A spacing (e.g., 9) of the I picture and a spacing (e.g., 3) of the I picture or B picture can be set arbitrarily. The spacing of the I picture or P picture may of course be changed within the group of picture layer. A pause of the group of picture layer can be represented by "*". Also, reference symbol I depicts the I picture, reference P depicts the P picture and reference symbol B depicts the B picture.

The video sequence layer shown on the topmost portion of FIG. 17 is composed of one or a plurality of group of picture layers whose picture sizes and image rates are the same.

Assuming that the digital image data high-efficiency-coded according to the MPEG1 system is recorded on the previously-mentioned mini disc, then the following problems will arise.

If the 1GOP recording unit is set to an arbitrary unit which is not related to the cluster, there is then the possibility that image data of 1GOP will be recorded over two clusters or greater. In this case, the GOP is started from somewhere in one cluster and may be ended somewhere in another cluster. As a result, it becomes difficult to carry out an edit processing, such as replacement to other GOP, by using the GOP as a cut unit. Even if the edit processing can be carried out, there is then the problem that an average transfer rate is lowered.

When the P picture or B picture which takes the final frame of the immediately-preceding GOP as the predictive picture (picture which becomes a reference) is disposed at the starting portion of the 2GOP, the immediately-preceding GOP also should be decoded in order to decode the P picture or B picture of the GOP. There is then the problem that, upon seek reproduction such as a fast forward and a reverse reproduction, it becomes difficult to reproduce a picture rapidly.

An object of the present invention is to enable an edit processing based on the unit of GOP to be carried out by a simple and rapid processing and to enable a special reproduction, such as a fast forward and a reverse reproduction to be carried out by a simple and rapid processing when high-efficiency-coded digital image data is recorded on a disc-shaped recording medium, such as a mini disc or the like.

SUMMARY OF THE INVENTION

According to the present invention, there is provided a disc-shaped recording medium on which high-efficiency-coded digital image data is clustered at every sector of a predetermined number, a link sector which is longer than an interleave length is provided at the connection portion of the clusters and the digital image data is interleaved. The disc-shaped recording medium is characterized in that the high-efficiency-coded digital image data is recorded on each cluster at the unit of one group of picture.

Here, when a disc-shaped recording medium is a disc-shaped recording medium that can only be reproduced and a forward predictive-coded picture or a bidirectionally predictive-coded picture exists at the starting portion of the cluster, a picture which becomes a predictive standard of the forward predictive-coded picture or the bidirectionally predictive-coded picture is coded as an intra-coded picture and recorded on the link sector of the immediately-preceding cluster.

According to the present invention, there is provided a disc recording apparatus in which a high-efficiency-coded digital image data is interleaved and recorded on a disc-shaped recording medium. The disc recording apparatus is comprised of encoding means for high-efficiency-coding an image signal into a digital image signal and recording means in which the high-efficiency-coded digital image data output from the encoding means is clustered at every sector of a predetermined number, a link sector which is longer than the interleave length is provided at the connected portion of each cluster and the high-efficiency-coded digital image data is interleaved and in which the digital image data is recorded on each cluster of the disc-shaped recording medium at the unit of one group of picture.

Further, according to the present invention, there is provided a disc reproducing apparatus which is comprised of reproducing means for reproducing from a disc-shaped recording medium in which high-efficiency-coded digital image data is clustered at every sector of a predetermined number, a link sector which is longer than an interleave length is provided at the connection portion of the clusters and the digital image data is interleaved the digital image data at the unit of one group of picture corresponding to each of the clusters, and decoding means for decoding a series of original image data from digital image data reproduced by the reproducing means at the unit of one group of picture.

Here, when a forward predictive-coded picture or a bidirectionally predictive-coded picture exists at the starting portion of the cluster, if it is determined on the basis of the digital image data reproduced by the reproducing means at the unit of one group of picture that a picture which becomes a predictive standard of the forward predictive-coded picture or the bidirectionally predictive-coded picture is not coded as an intra-coded picture and is not recorded on the link sector of the immediately-preceding cluster, the decoding means is inhibited from substantially decoding the forward predictive-coded picture or the bidirectionally predictive-coded picture recorded at the starting portion of the cluster.

According to the disc-shaped recording medium, the disc recording apparatus and the disc reproducing apparatus of the present invention, since the high-efficiency coded digital image data is recorded on each cluster at the unit of one group of picture, an edit processing and special reproduction, such as high-speed feed forward and reverse reproduction based on the GOP unit become possible.

When the disc-shaped recording medium is such one that can only be reproduced and the forward predictive-coded picture or bidirectionally predictive-coded picture exists at the starting portion of the cluster, it becomes possible to reproduce a picture of high picture quality at high speed by encoding and recording a picture, which becomes a predictive standard of the forward predictive-coded picture or the bidirectionally predictive-coded picture, on the link sector of the immediately-preceding cluster as an intra-coded picture.

Furthermore, when the forward predictive-coded picture or the bidirectionally predictive-coded picture exists on the starting portion of the cluster, if it is determined that the picture, which becomes a predictive standard of the forward predictive-coded picture or the bidirectionally predictive-coded picture, is not coded as the intra-coded picture and is not recorded on the link sector of the immediately-preceding cluster, then it is possible to prevent a picture quality of a reproduced picture from being degraded due to disorder of picture by substantially inhibiting the forward predictive-coded picture or the bidirectionally predictive-coded picture recorded at the starting portion of the cluster from being decoded.

BEST MODE FOR CARRYING OUT THE INVENTION

An outer face structure of the embodiment according to the present invention will be described with reference to FIGS. 1 and 2.

Figure 1:
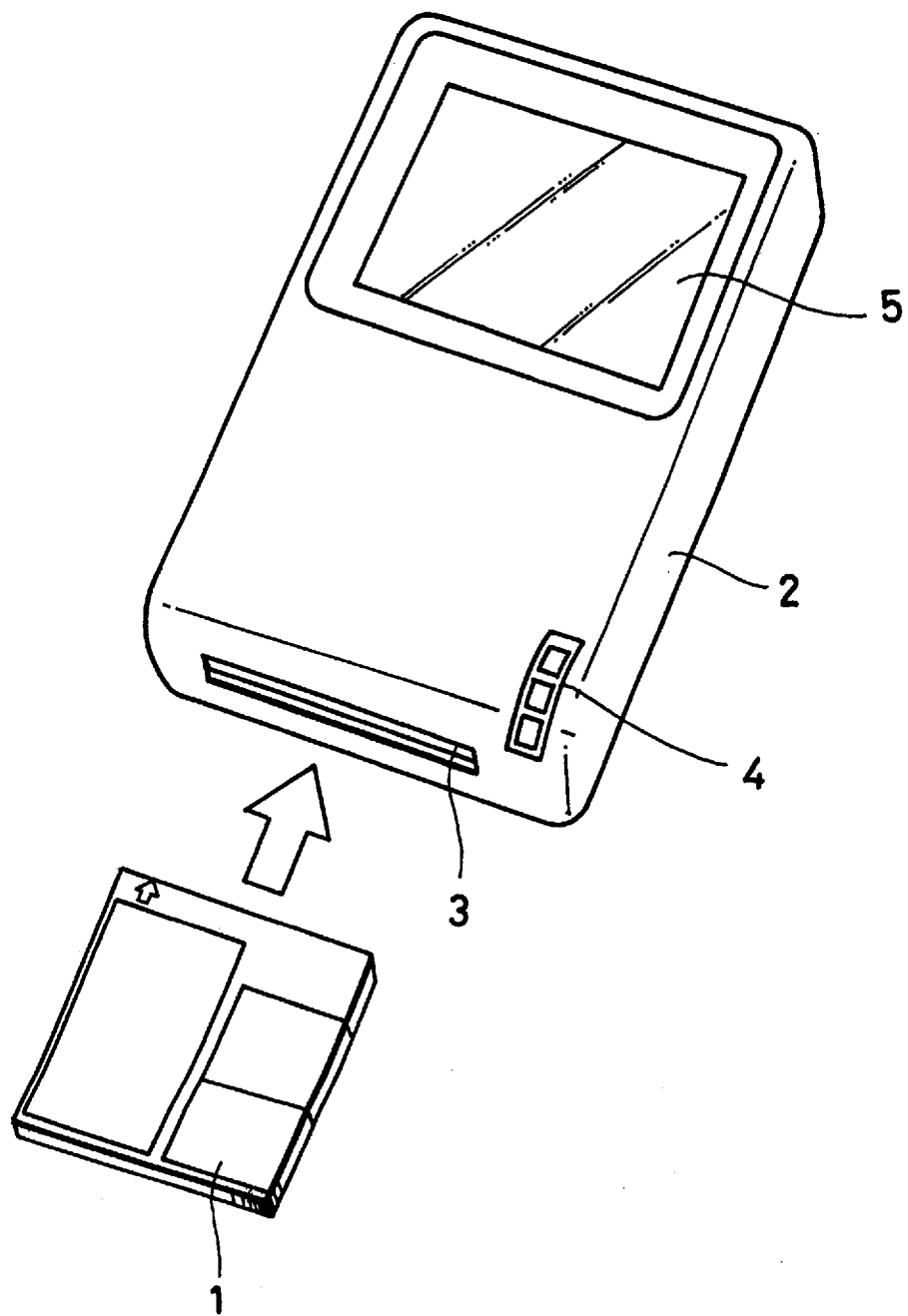
FIG. 1 is a perspective view showing an outer face structure of a disc recording and reproducing apparatus according to an embodiment of the present invention.

FIG. 1 is a perspective view showing an outer face structure of one embodiment of the disc-shaped recording medium and the disc recording and reproducing apparatus according to the present invention. A cartridge shown in the figure accommodates a mini disc (generally referred to together with the cartridge 1 as mini disc) formed of a magneto-optical disc or optical disc. When the mini disc is formed of the magneto-optical disc, digital data can be recorded on and reproduced from the mini disc magneto-optically. A disc recording and reproducing apparatus 2 has an insertion slot 3 defined on the front surface side. The disc recording and reproducing apparatus 2 houses a loading mechanism for loading or unloading the cartridge 1 with the mini disc accommodated therein when the cartridge is inserted into the insertion slot 3. The disc recording and reproducing apparatus 2 has a key pad 4 with various operation keys provided on the right front surface thereof to enter various commands into the disc recording and reproducing apparatus 2. The disc recording and reproducing apparatus 2 has a color LCD (liquid crystal display) 5 provided above the front surface thereof. The color LCD 5 displays a color moving picture decoded after it was reproduced from the mini disc.

Figure 2:
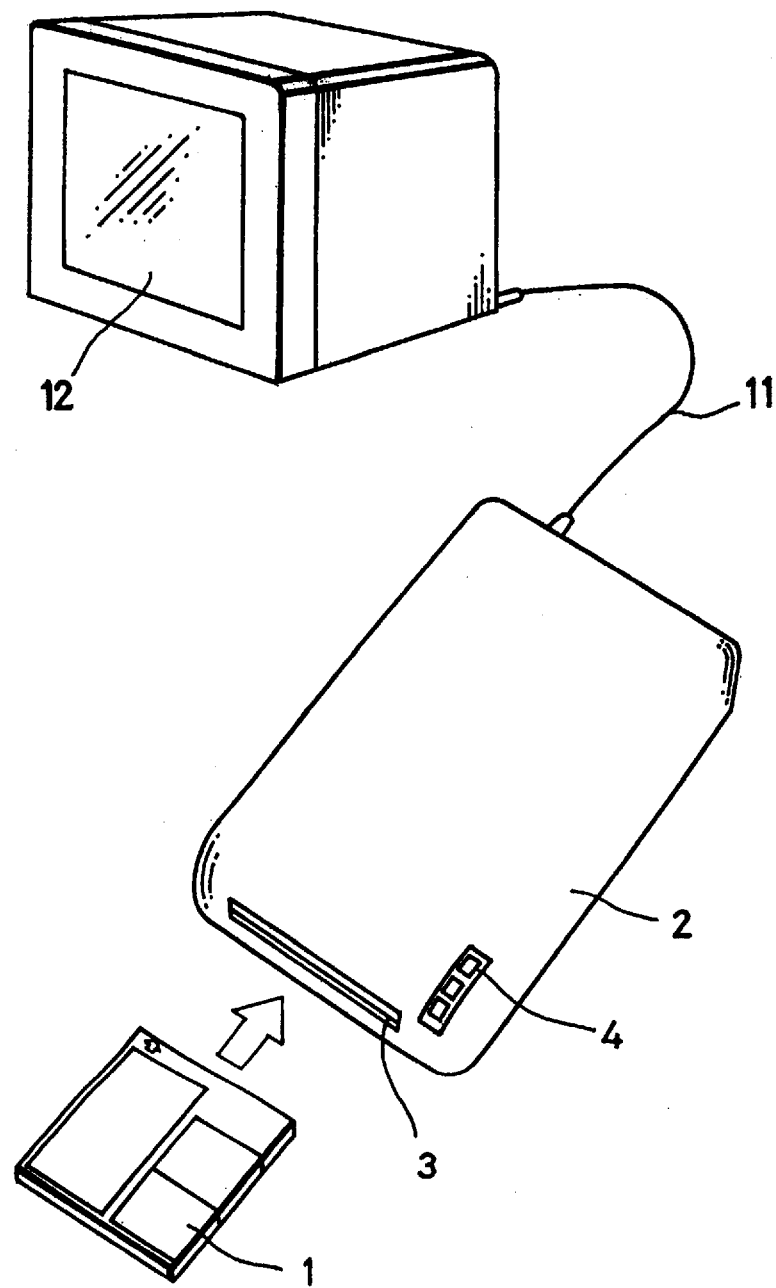
FIG. 2 is a perspective view showing an outer face structure of a disc recording and reproducing apparatus according to another embodiment of the present invention.

FIG. 2 is a perspective view showing an outer face arrangement of a disc recording and reproducing apparatus according to another embodiment of the present invention. In this embodiment, the color LCD 5 in the embodiment shown in FIG. 1 is omitted. A video signal output from the disc recording and reproducing apparatus 2 is supplied through a cable 11 to a color CRT display monitor 12 and thereby displayed. Specifically, while the embodiment shown in FIG. 1 shows a portable type disc recording and reproducing apparatus, the embodiment shown in FIG. 2 shows a installation-type disc recording and reproducing apparatus.

Figure 3:
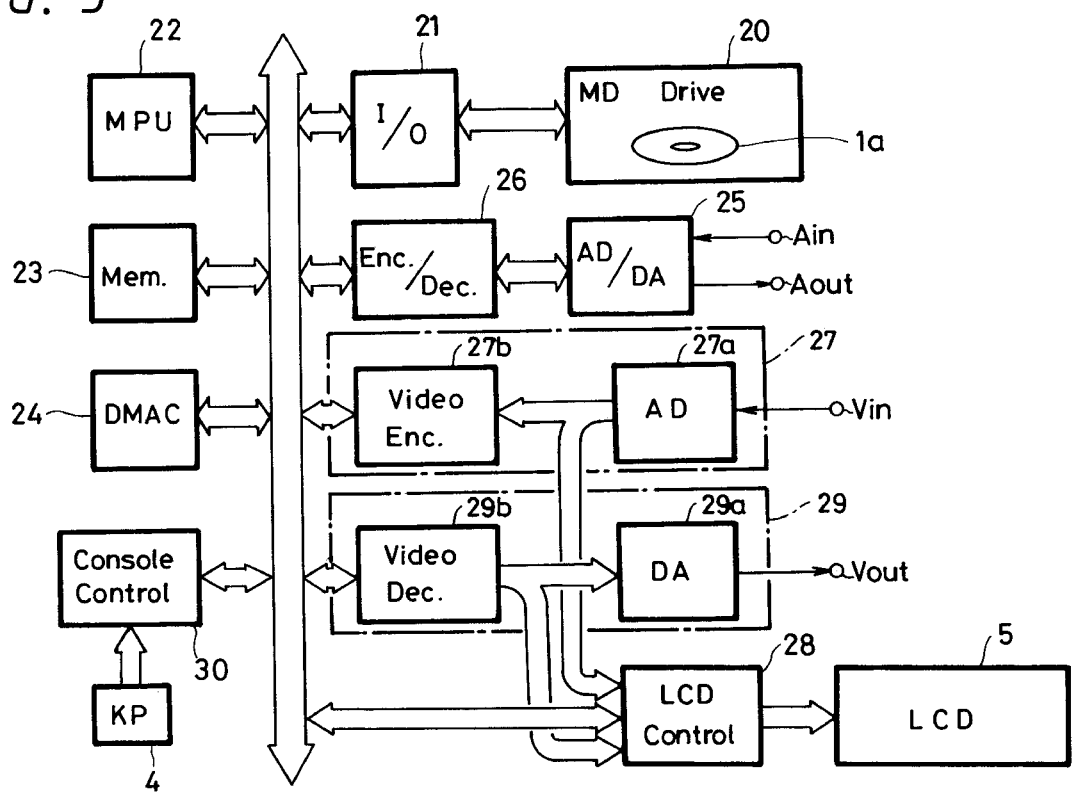
FIG. 3 is a block diagram showing an electrical arrangement of the disc recording and reproducing apparatus according to the embodiment of the present invention.

FIG. 3 shows an electrical arrangement of the inside of the disc recording and reproducing apparatus. A MD (mini disc) drive apparatus 20 records and reproduces digital data on and from the mini disc 1a accommodated in the cartridge 1.

The MD drive apparatus 20 is designed based on a mini disc system that is developed as portable, installation type or mobile personal audio equipment. The mini disc system uses a small and thin recording medium called a mini disc. The mini disc includes a cartridge (W×L×H=72 mm×68 mm×5 mm) in which any one of a read-only optical disc with a diameter of 64 mm, a writable MO (magneto-optical) disc or a hybrid disc (or also referred to as a partial ROM disc) in which a write area and a read-only area are provided is accommodated. Data can be read out from the read-only optical disc on the basis of a principle similar to that of the CD (Compact Disc). On the other hand, data can be recorded on the MO disc or the hybrid disc according to a magnetic field modulation direct overwrite system. The magnetic field modulation direct overwrite system is of the system that data is written on the rotating disc from above at the portion radiated with high power laser beam from below up to the Curie temperature at which a magneto-optical film of the recorded portion is heated so as to lose the coercive force of the magnetic material.

Since the mini disc system has been developed as personal audio equipment, circuit devices are integrated and assembly parts are optimized so that the whole of the apparatus can be miniaturized and made light in weight. Also, the mini disc system consumes less power and can therefore be driven by battery. Further, the mini disc system has substantially the same storage capacity (140 Mbytes) as that of the existing 3.5-inch MO disc and therefore the recording media can be exchanged. In addition, the mini disc system can be mass-produced and a manufacturing cost of the recording media thereof can be reduced as compared with other MO disc. Also, the manufacturing cost of the drive apparatus body can be reduced. Furthermore, since the mini disc system has been successfully used as personal audio equipment, the mini disc system can be proved to be high in reliability.

Figure 8:
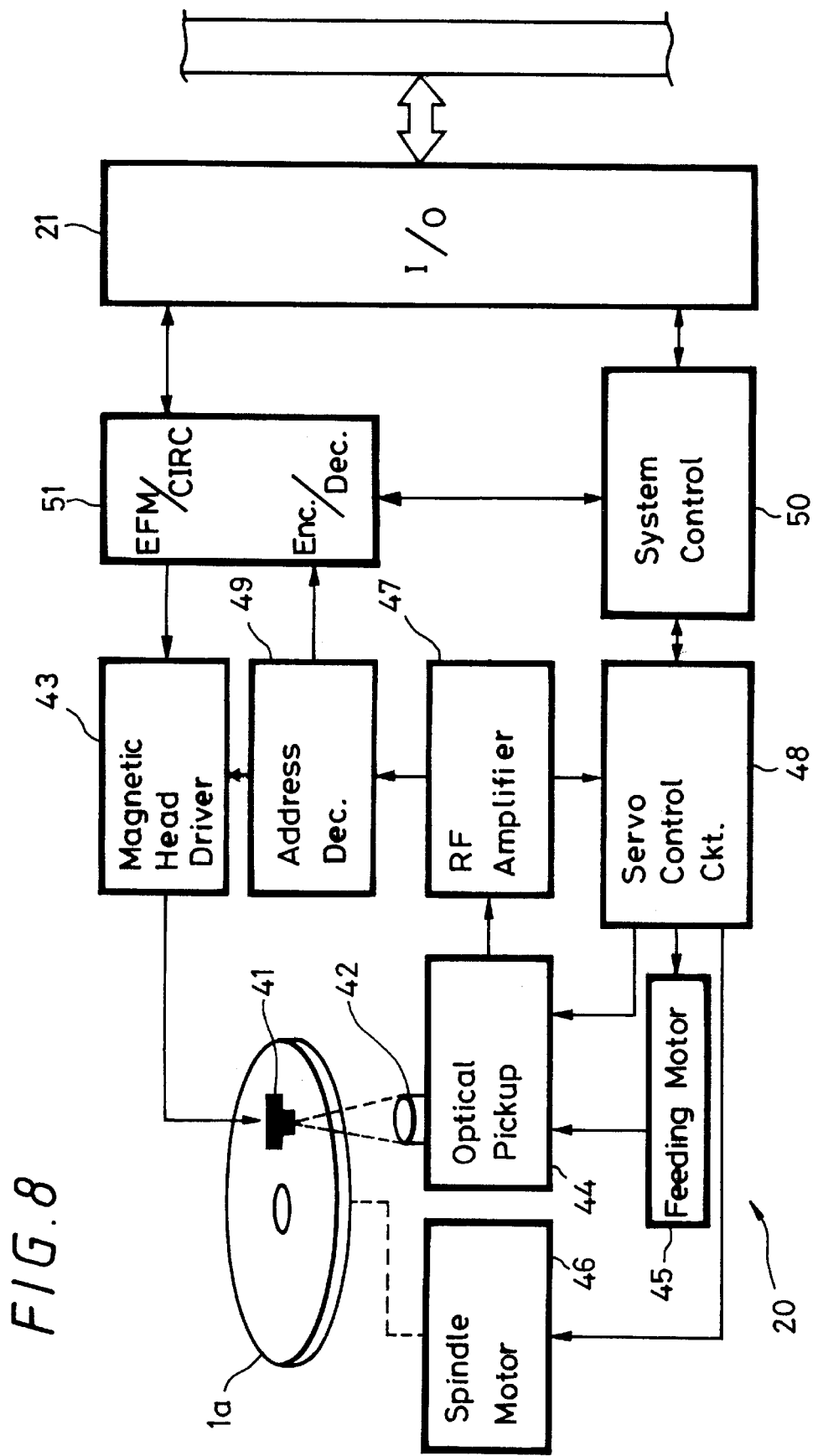
FIG. 8 is a block diagram showing an electrical arrangement of an MD drive apparatus which is applied to the embodiment of the present invention.

The arrangement of the MD drive apparatus 20 will be fully described later on with reference to FIG. 8. As shown in FIG. 3, the MD drive apparatus 20 is connected through an I/O interface circuit 21 to a bus line.

In FIG. 3, an MPU (microprocessor unit) 22 supplies necessary address and data through the bus line to respective units to control the respective units. A main memory 23 is composed of a ROM in which program executed by the MPU 22 is stored previously and a RAM used as a work area to temporarily store various data. The main memory is supplied with address from the MPU 22 through the bus line and various data are written in and read out from the main memory.

A DMAC (direct memory access controller) 24 directly controls input and output data to and from the main memory 23 bypassing the MPU 22 to transfer data in a DMA fashion.

An audio AD/DA (analog-to-digital/digital-to-analog) converting circuit 25 converts an analog audio signal input to an analog audio input terminal Ain to a digital audio signal and supplies the digital audio signal to an audio encoder/decoder 26. This circuit also converts digital audio data supplied thereto from the audio encoder/decoder 26 to analog audio data and outputs the analog audio data to an analog audio terminal Aout. The audio encoder/decoder 26 encodes and compresses the digital audio data supplied thereto from the audio AD/DA converting circuit 25 according to a predetermined system standardized by the MPEG audio standards. Coded audio data thus encoded is temporarily stored in the main memory 23 under the control of the DMAC 24. The audio encoder/decoder decodes coded audio data read out from the main memory 23 to restore the original digital audio data and supplies the same to the audio AD/DA converting circuit 25. Coded audio data is exchanged between the main memory 23 and the audio encoder/decoder 26 under the control of the DMAC 24.

A video encoding unit 27 comprises an AD converter 27a for A/D-converting an analog video signal input to an analog video input terminal Vin and an MPEG video encoder 27b for encoding and compressing the digital video data thus converted by the AD converter 27a based on the MPEG1 standard. Coded video data that was encoded by the MPEG video encoder 27b is temporarily stored in the main memory 23 under the control of the DMAC 24.

The digital video data that was converted by the AD converter 27a is also supplied to an LCD controller 28, and displayed by the LCD 5 under the control of the LCD controller 28. In the arrangement without the LCD 5, as shown in FIG. 2, the digital video data is supplied through the external cable 11 to the CRT display monitor 12 and is thereby displayed.

A video decoding unit 29 comprises an MPEG video decoder 29b for decoding the coded video data read out from the main memory 23 to restore the original digital video data and a DA converter 29a for D/A-converting the digital video data decoded by the MPEG video decoder 29b and outputting analog video data to an analog video output terminal Vout.

Further, the digital video data decoded by the MPEG video decoder 29b is supplied to the LCD controller 28 and displayed by the LCD 5 under the control of the LCD controller 28.

Coded video data is exchanged among the MPEG video encoder 27b, the MPEG video encoder 29b and the main memory 23 under the control of the DMAC 24.

Further, various data are exchanged between the main memory 23 and the MD drive apparatus 20 through the I/O interface 21 under the control of the DMAC 24.

The console controller 30 supplies various command data supplied thereto through the keys on the key pad 4 through the bus line to the MPU 22.

An example of a specific arrangement of the MPEG video encoder 27b will be described with reference to FIG. 4. A blocked digital video signal from an input terminal 61 is supplied to a subtracter 62 and a motion vector detecting circuit 72. The blocked digital video signal is of a signal that a digital video signal formed of discrete pixel data train is converted in time series to a plurality of unit block signals formed of pixel data arranged in an 8×8 matrix form in the horizontal and vertical directions of the picture screen at every picture.

The subtracter 62 subtracts the unit block signal of this blocked digital video signal and a unit block signal of pixel data configuration similar to the unit block signal, i.e., predictive unit block signal compensated by the motion compensating circuit 71.

A difference unit block signal (not always the difference unit block signal but sometimes the unit block signal), which is a subtracted output from the subtracter 62, is supplied to a 2-dimensional discrete cosine transform circuit (2-dimensional DCT circuit) 63 which is an orthogonal transform circuit and thereby cosine-transformed. A transform coefficient from the 2-dimensional DCT circuit 63 is supplied to a quantizing circuit (re-quantizing circuit) 64 and thereby quantized.

The transform coefficient thus quantized is supplied to a variable length coding circuit 65, in which it is variable-length-coded and then output at an output terminal 66 as a quantized variable-length-coded transform coefficient (coded data).

The unit block signal composing a frame signal stored in a frame memory 70 is supplied to the motion compensating circuit 71. The motion compensating circuit 71 is controlled by a detected output from a motion vector detecting circuit 72 so as to judge correlation of respective unit block signals stored within the frame memory 70. Then, the unit block signal with highest correlation is output from the motion compensating circuit 71 as the predictive unit block signal and supplied to the subtracter 62 and the adder 69.

The quantized transform coefficient from the transform coefficient quantizing circuit 64 is supplied to an inverse quantizing circuit 67, in which it is inverse-quantized to output a transform coefficient. The transform coefficient is supplied to a 2-dimensional discrete cosine inverse transform circuit (2-dimensional discrete IDCT circuit) 68 which derives the original difference unit block signal.

The difference unit block signal is added to the predictive unit block signal from the motion compensating circuit 71 by the adder 69. The unit block signal from the adder 69 is supplied to the frame memory 70 and thereby all unit block signals constructing the frame signal to which the unit block signals belong are stored in the frame memory.

The motion vector detecting circuit 72 detects a unit block signal with highest correlation in the vicinity of unit block signals corresponding to each block signal of the blocked digital video signal supplied thereto through the input terminal 61 from the frame memory 70 in association with each unit block signal of the block digital video signal from the input terminal 61.

The block signals constructing the frame signal and which are stored in the frame memory 70 are supplied to the motion compensating circuit 71. Then, the motion compensating circuit 71 is controlled by the detected output from the motion vector detecting circuit 72 so as to judge correlations of the respective block signals stored in the frame memory 70. Then, the block signal with highest correlation is output from the motion compensating circuit 71 as the predictive block signal and supplied to the subtracter 62 and the adder 69.

An example of a specific arrangement of the MPEG video decoder 29b will be described with reference to FIG. 5. The variable-length-coded and quantized transform coefficient (coded data) corresponding to the output signal of the output terminal 66 shown in FIG. 4 is supplied from an input terminal 81 to a variable length decoding circuit 82 and thereby variable-length-decoded. The quantized transform coefficient from the variable length decoding circuit 82 is supplied to an inverse quantizing circuit 83 and thereby inverse-quantized. The resultant transform coefficient is supplied to a 2-dimensional discrete cosine inverse transform circuit (2-dimensional IDCT circuit) 84, in which it is inverse-transformed and output as a difference unit block signal (not always the difference unit block signal but the unit block signal sometimes).

When the 2-dimensional IDCT circuit 84 outputs not the difference unit block signal but the unit block signal (unit block signal of I picture), a change-over switch 85 connects a movable contact m to a fixed contact a so that the unit block signal is output through the change-over switch 85 to an output terminal 86.

When the 2-dimensional IDCT circuit 84 outputs the difference unit block signal the change-over switch 85 connects the movable contact m to a fixed contact b. In this case, the difference unit block signal from the 2-dimensional IDCT circuit 84 is supplied to an adder 93, in which it is added with a predictive unit block signal from a change-over switch 92. Thus, the unit block signal from the adder 93 is output through the change-over switch 85 to the output terminal 86.

The predictive unit block signal from the adder 93 is supplied through the fixed contact b and the movable contact m of the change-over switch 85 to a frame memory 87. All unit block signals constructing the frame signal to which the predictive unit block signals from the adder 93 belong are stored in the frame memory 87.

The frame signal read out from the frame memory 87 is supplied to another frame memory 90. Frame signals advanced and delayed by a predetermined frame from the frame memories 87 and 90 are respectively supplied to a motion compensation forward predictive-coded circuit 88 and a motion compensation backward predictive-coded circuit 91. An average signal of the predetermined-frame advanced signal and the predetermined-frame delayed signal is supplied to a motion compensation bidirectionally predictive-coded circuit 89.

The predictive-coded circuits 88, 91 and 89 select predictive unit block signals with highest correlation from unit block signals of predetermined advanced and delayed frames which are unit block signals near the unit block signal of a certain frame relative to the unit block signal of a certain frame and an average unit block signal. When a forward predictive-coded unit block signal (predictive unit block signal of P picture) is obtained, the change-over switch 92 connects the movable contact m to a fixed contact c so that the unit block signal with the highest correlation is supplied to the adder 93 and thereby added to the difference unit block signal from the 2-dimensional IDCT circuit 84.

Further, when the bidirectionally predictive-coded signal (predictive unit block signal of B picture) is obtained, of the three predictive unit block signals with high correlation, the change-over switch 92 selects the predictive unit block signal with highest correlation by selectively connecting the movable contact m to the fixed contacts c, d, e. This predictive unit block signal with the highest correlation is supplied to the adder 93, in which it is added with the difference unit block signal from the 2-dimensional IDCT circuit 84.

Figure 4:
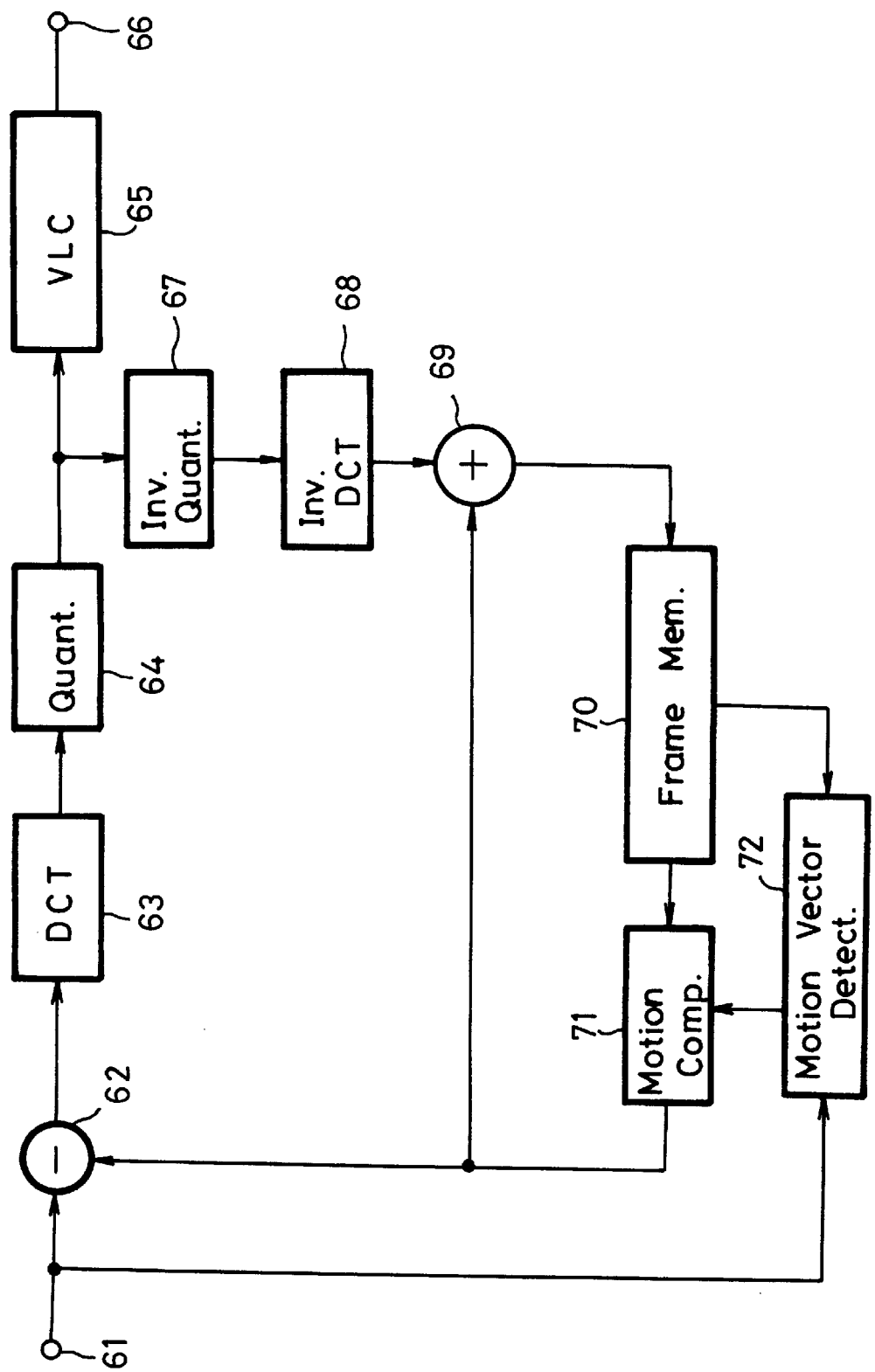
FIG. 4 is a block diagram showing an example of a specific arrangement of an MPEG video encoder 27b shown in FIG. 3.
Figure 5:
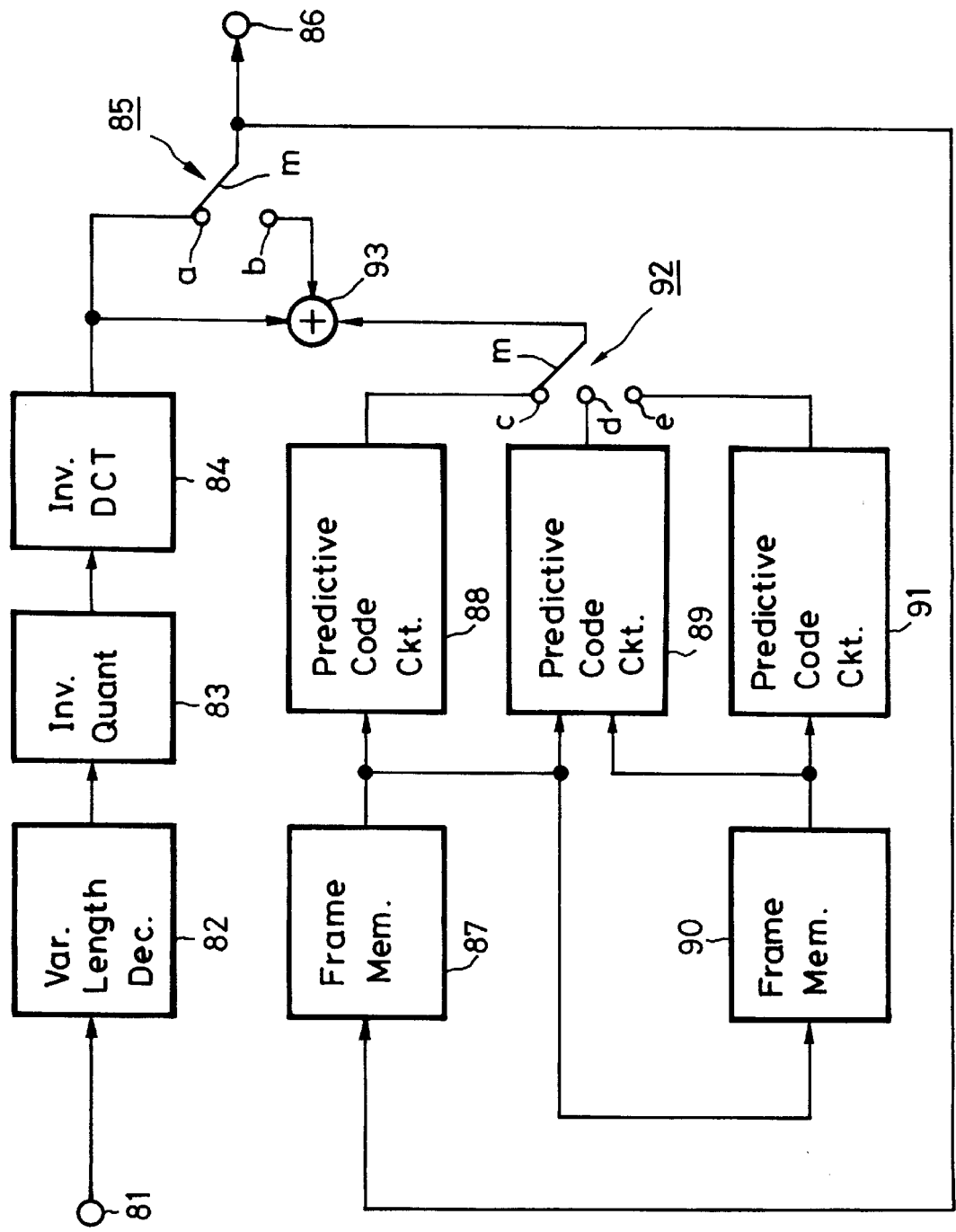
FIG. 5 is a block diagram showing an example of a specific arrangement of an MPEG video encoder 29b shown in FIG. 3.

The MPEG video encoder and decoder described in FIGS. 4 and 5 were described more in detail in Japanese laid-open patent publication No. 05-95545 or the like.

Operation of the thus arranged disc recording and reproducing apparatus will be described next.

When the user enters a command for recording input audio and video signal by operating predetermined keys on the key pad 4, this command is supplied through the bus line to the MPU 22 under the control of the console controller 30. The MPU 22 responds to this command to control respective units in a procedure which will be described below, thereby recording the coded audio data and the coded video data thus encoded based on the MPEG1 standard on the mini disc 1a.

The audio signal input to the analog audio terminal Ain is A/D-converted by the audio AD/DA converting circuit 25 and supplied to the audio encoder/decoder 26. The audio encoder/decoder 26 temporarily stores the encoded audio data of one cluster amount (32 sectors) in its incorporated RAM.

When the audio encoder/decoder 26 generates the coded audio data (about 64 KBytes) of one cluster amount, such data is transferred in a DMA fashion and stored in the main memory 23 under the control of the DMAC 24. The data of one cluster stored in the main memory 23 is read out at a predetermined timing under the control of the DMAC 24 and transferred through the I/O interface circuit 21 to the MD drive apparatus 20 in a DMA fashion, whereby it is recorded on the mini disc 1a.

Figure 6:
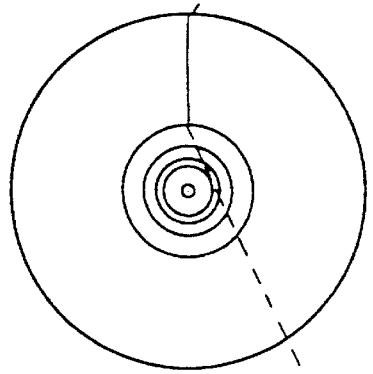
FIG. 6 is a conceptual diagram used to explain a recording format of a mini disc which is applied to the embodiment of the present invention.

In the MD drive apparatus 20, data of one cluster amount is interleaved at the unit of clusters and recorded on the mini disc 1a. Specifically, in the mini disc of magneto-optical disc type that can be recorded and reproduced, as shown in FIG. 6, of one cluster, 3 sectors are maintained as link sectors and the following one sector is maintained as a sub-data sector. Data is recorded on the remaining 32 sectors. When data is recorded, data starts being written in the second link sector of the preceding cluster. When data finishes being written in the 36th sector, error-correction data is written into the starting link sector and the second link sector.

According to this embodiment, as shown in FIG. 6, one cluster is composed of 36 sectors and substantial data is recorded on the first 32 sectors, and substantial data is not recorded on the last 4 sectors. Error-correction data for data recorded on the adjacent cluster is recorded on the link sectors of the first 3 sectors of the last 4 sectors. The last 1 sector is employed as the sub-data sector in which reserve graphics data or the like corresponding to data recorded on the first 32 sectors can be recorded. In this embodiment, reserve graphics data is not recorded therein. Address information and data are recorded on each sector.

Similarly, the video signal input to the analog video input terminal Vin is A/D-converted by the A/D converting circuit 27a and supplied to the MPEG video encoder 27b, in which it is encoded. This coded video data of one cluster amount (32 sectors) also is temporarily stored in the incorporated RAM similarly to the aforementioned coded audio data. When the MPEG video encoder 27b generates the coded video data of one cluster amount, such data is transferred to in a DMA fashion and stored in the main memory 23 under the control of the DMAC 24. The data of one cluster stored in the main memory 23 is read out at a predetermined timing under the control of the DMAC 24, transferred in a DMA fashion through the I/O interface circuit 21 to the MD drive apparatus 20, in which it is interleaved at the unit of clusters and recorded on the mini disc 1a.

Figure 7:
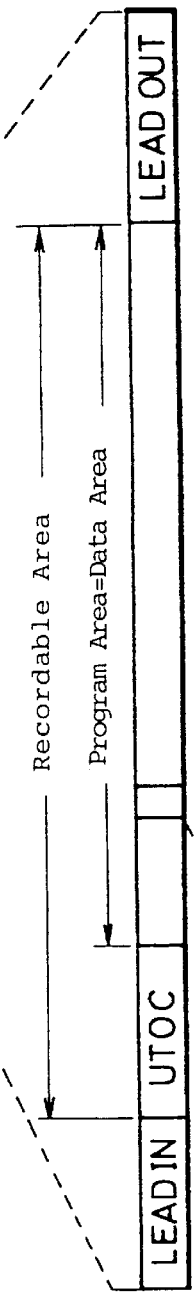
FIG. 7 is a conceptual diagram used to explain cluster interleaving which is applied to the embodiment of the present invention.
Figure 7:
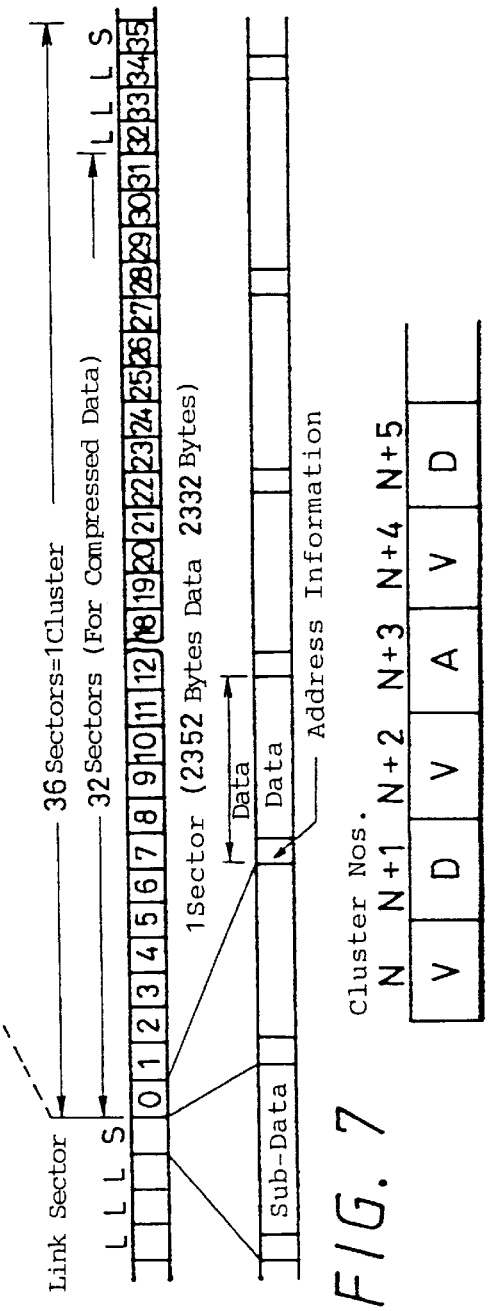

In this embodiment, the coded video data and the coded audio data are cluster-interleaved and recorded on the mini disc 1a as shown in FIG. 7. Specifically, the coded video data represented by reference symbols V and the coded audio data represented by reference symbols A are alternately disposed at different clusters under the control of the MPU 22. Predetermined data D, such as program data and character data other than the coded video data V and the coded audio data A are recorded on clusters different from the clusters in which the coded video data V or the coded audio data A are recorded. It becomes possible to increase processing speed of recording and reproduction by recording only associated data with highly strong correlation on the same cluster, i.e., by recording the coded video data V, the coded audio data A and other data D in different clusters.

However, in order to make high-speed reproduction become possible during a seek operation, corresponding ones of the coded video data V, the coded audio data A and other data D should be disposed in relatively nearby clusters because these related data have to be reproduced at substantially the same time.

In the process of the above-mentioned recording operation, digital video data that was converted by the A/D converter 27a is supplied to the LCD controller 28 and displayed by the LCD 5 under the control of the LCD controller 28. Alternatively, with the arrangement which does not have the LCD 5, as shown in FIG. 2, such digital video data is supplied through the external cable 11 to the CRT display monitor 12 and thereby displayed. Thus, the user can monitor a picture being recorded.

Operation in the playback mode will be described next. When the user enters a playback command to the apparatus by operating keys on the key pad 4, this playback command is supplied through the console controller 30 to the MPU 22. At that time, the MPU 22 controls the MD drive apparatus 20 so as to reproduce data recorded on the mini disc 1a. Reproduced data is transferred through the I/O interface circuit 21 to the main memory 23 in a DMA fashion. Of data stored in the main memory 23, the coded audio data is transferred to the audio encoder/decoder 26 and the coded video data is transferred to the video decoding unit 29 in a DMA fashion.

The coded audio data of one cluster amount supplied to the audio encoder/decoder 26 is decoded and D/A-converted by the audio AD/DA converting circuit 25, whereafter it is output from the analog audio output terminal Aout.

On the other hand, the coded video data of one cluster amount supplied to the video decoding unit 29 is decoded and supplied to the LCD controller 28, thereby displayed on the LCD 5 under the control of the LCD controller 28. Alternatively, with the arrangement which does not have the LCD 5, the coded video data is D/A-converted by the DA converter 29a and supplied through the external cable 11 to the CRT display monitor 12 shown in FIG. 2 and thereby displayed.

An arrangement of the MD drive apparatus 20 will be described with reference to FIG. 8.

Data is recorded along recording tracks on the mini disc 1a in a magnetic field modulation overwrite fashion by applying a modulated magnetic field corresponding to recorded data to a magnetic head 41 while the mini disc 1a rotated by a spindle motor 46 shown in the figure is radiated with laser beams emitted from an optical pickup 44. Data is optically reproduced by scanning a target track with laser beams emitted from the optical pickup 44.

The optical pickup 44 comprises a laser light source, such as a laser diode or the like, optical parts, such as a collimator lens, an objective lens, a polarizing beam splitter, a cylindrical lens or the like, and a photodetector divided at predetermined locations. The optical pickup is placed by a feeding motor 45 at the position opposing the magnetic head 41 across the mini disc 1a.

The optical pickup 44 records data in a thermomagnetic recording fashion by radiating laser beams on the target track of the mini disc 1a to which modulated magnetic field corresponding to recorded data is applied while the magnetic head 41 is moved by the magnetic head driver circuit 43 when data is recorded on the mini disc 1a.

The optical pickup 44 generates a reproduced signal by detecting the laser beam radiated on the target track, such as detecting a focusing error based on an astigmatism method, or, detecting a tracking error based on a push-pull method or using diffraction phenomenon of light in pit trains of the target track of the preformatted mini disc. When data is reproduced from the recordable mini disc 1a, the optical pickup device generates a reproduced signal by detecting the difference between polarizing angles (Kerr rotation angles) of reflected light from the target track.

An output from the optical pickup 44 is supplied to an RF amplifier 47. The RF amplifier 47 extracts a focusing error signal and a tracking error signal from the output of the optical pickup 44 and supplies the same to a servo control circuit 48. Also, this amplifier converts the reproduced signal to a binary reproduced signal and supplies the same to an address decoder 49. The address decoder 49 decodes address from the binary reproduced signal supplied thereto and supplies decoded address to an EFM/CIRC encoder/decoder 51.

The servo control circuit 48 comprises a focusing servo control circuit, a tracking servo control circuit, a spindle motor servo control circuit and a sled servo control circuit or the like, for example.

The focusing servo control circuit controls focusing of the optical system of the optical pickup 44 so that a focusing error signal is cancelled out. The tracking servo control circuit controls the feeding motor 45 of the optical pickup 44 so that the tracking error signal is cancelled out.

Further, the spindle motor servo control circuit controls the spindle motor 46 so that the mini disc 1a is rotated at a predetermined rotational speed (e.g., at constant linear velocity). The sled servo control circuit moves the magnetic head 41 and the optical pickup 44 to the target track position of the mini disc 1a designated by a system controller 50 by the feeding motor 45.

The EFM/CIRC encoder/decoder 51 encodes data supplied thereto through the I/O interface circuit 21 for error-correction, i.e., using CIRC (Cross Interleave Read-Solomon Code) and also modulates the data for recording, i.e., using EFM (Eight to Fourteen Modulation).

Encoded data output from the EFM/CIRC encoder/decoder 51 is supplied to the magnetic head driver circuit 43 as recording data. The magnetic head driver circuit 43 drives the magnetic head 41 so that the magnetic head 41 applies modulated magnetic field corresponding to the recording data to the mini disc 1a.

When supplied with the write command through the I/O interface 21 from the MPU 22, the system controller 50 controls the recording position on the mini disc 1a such that the recording data is recorded on a predetermined recording track of the mini disc 1a. The recording position is controlled by managing recording position information supplied onto the mini disc 1a from encoded data output from the EFM/CIRC encoder/decoder 51 under the control of the system controller 50 so that a control signal which designates the recording position of the recording track on the mini disc 1a is supplied from the system controller 50 to the servo control circuit 48. Thus, according to the so-called magnetic field modulation magneto-optical recording system, encoded audio data, encoded video data and other digital data added when necessary, are recorded on the mini disc 1a at the unit of clusters as described above.

Upon reproduction, the EFM/CIRC encoder/decoder 51 EFM-decodes the input binary reproduced data and CIRC-decodes the input binary reproduced data for error-correction and outputs the data thus processed to the I/O interface 21.

When supplied with the read command through the I/O interface 21 from the MPU 22, the system controller 50 controls the reproducing position relative to the recording track of the mini disc 1a such that reproduced data is continuously obtained. The reproducing position is controlled by managing recording position information supplied to the mini disc 1a from the reproduced data under the control of the system controller 50 such that a control signal which designates the reproducing position of the recording track of the mini disc 1a is supplied to the servo control circuit 48 from the system controller 50.

Figure 9:
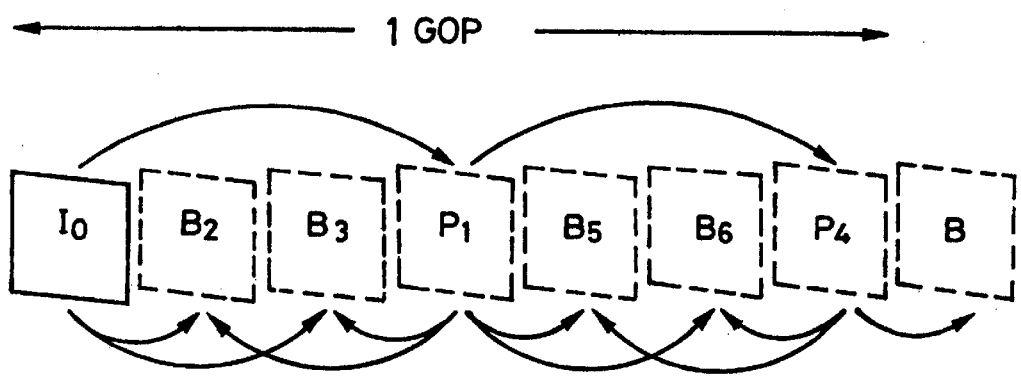
FIG. 9 is a conceptual diagram used to explain a group of picture which is applied to the embodiment of the present invention.

The relationship between the GOP and the cluster according to the embodiment of the present invention will be described with reference to FIGS. 9 and 10. In this embodiment, as shown in FIG. 9, when the GOP is formed of an image of 7 frames (may be fields), for example, an image of the first frame is set to I picture I0, and an image of 4th frame is set to a P picture P1 which is forward predictive-coded picture from the picture I0 of the 1st frame. An image of the final 7th frame is set to a P picture P4 which is a forward predictive-coded picture from the P picture P1 of the 4th frame. Images of 2nd and 3rd frames are respectively set to B pictures B2 and B3 which are bidirectionally predictive-coded pictures coded from the preceding I picture I0 and the succeeding P picture P1. Similarly, images of 5th and 6th frames are set to B pictures B5 and B6 which are a bidirectionally predictive-coded pictures coded from the P picture P1 of the 4th frame and the P picture P4 of the 7th frame.

Figure 10:
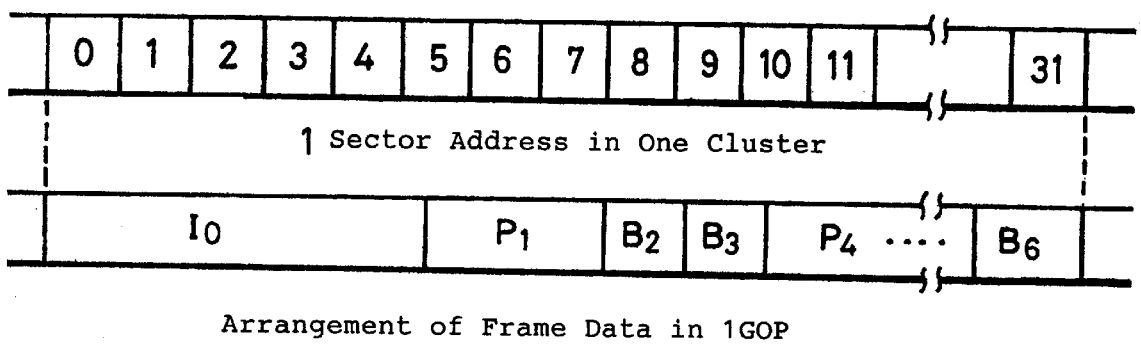
FIG. 10 is a conceptual diagram used to explain relationship between the group of picture and a cluster which are applied to the embodiment of the present invention.

According to this embodiment, as shown in FIG. 10, 1GOP coded video data is encoded so as to be disposed within 32 sectors of 1 cluster and then recorded on the mini disc 1a. In this case, in the mini disc 1a of the preformatted ROM type, when the coded video data based on the MPEG standard is generated, the coded video data is previously encoded at the unit of 1GOP so as to be recorded on respective clusters, respectively. Then, based on the coded video data thus generated, the mini disc is processed by stamping through a manufacturing process similar to that of the CD and the mini disc 1a on which the same coded video data is recorded is mass-produced.

In the mini disc 1a of the recordable RAM type or the hybrid type (partial ROM type) in which a writing area and a read-only area are provided in the hybrid form, the MPEG video encoder 27b in the video encoding unit 27 encodes the video data at the unit of 1GOP so that the video data are respectively recorded on each of the clusters. Then, the coded video data thus generated is transferred to the MD drive apparatus 20 in a DMA fashion and recorded on the mini disc 1a.

The encoding order is illustrated by reference numerals in FIG. 9. Specifically, image of frames input in the order of I0, B2, B3, P1, B5, B6, P4 are sequentially encoded in the order of I0, P1, B2, B3, P4, B5, B6. The encoded video data are disposed in respective sectors of one cluster in the encoded order.

When the 1GOP coded video data cannot be disposed within 32 sectors of 1 cluster unusually, the coded video data of GOP is recorded with a plurality of consecutive clusters. When the recorded position of coded video data corresponding to the final frame of GOP does not correspond to the final sector of the cluster, substantially invalid dummy data, such as "0" or the like, is additionally recorded on the remaining sectors of the same cluster.

As described above, according to this embodiment, the starting frame of 1GOP is encoded as an I picture and the last frame is encoded as a P picture. The first I picture is constantly disposed at the first cluster. With this arrangement, when an image of predetermined cluster is intermittently extracted and reproduced by seeking the mini disc 1a, for example, since the I picture is constantly disposed at the starting portion of each cluster, it becomes possible to completely decode one frame of the extracted cluster. Further, since coded video data of different GOPs are not disposed within the same cluster, it becomes possible to edit the coded video data with ease at the cut unit, such as to replace the coded video data with other coded video data at the unit of 1GOP.

Figure 11:
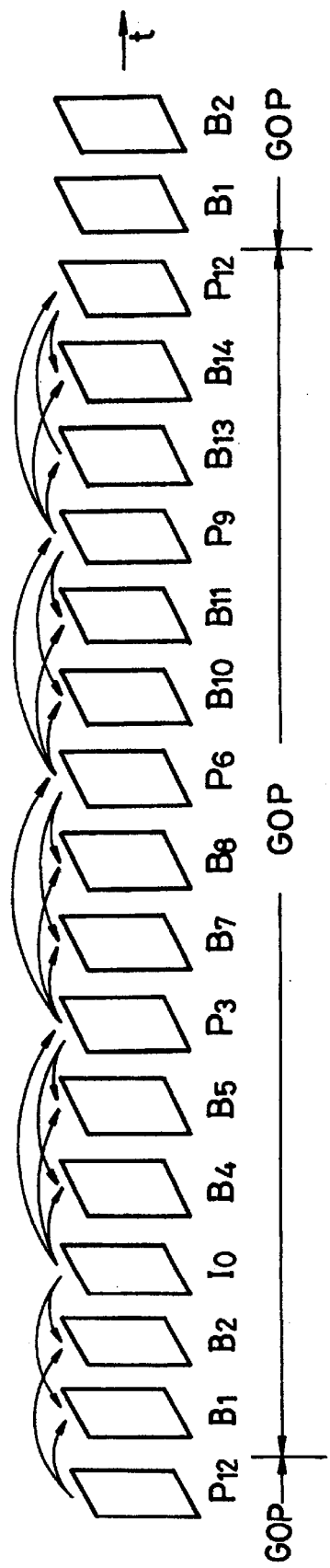
FIG. 11 is a conceptual diagram used to explain another example of a structure of the group of picture which is applied to the embodiment of the present invention.
Figure 12:
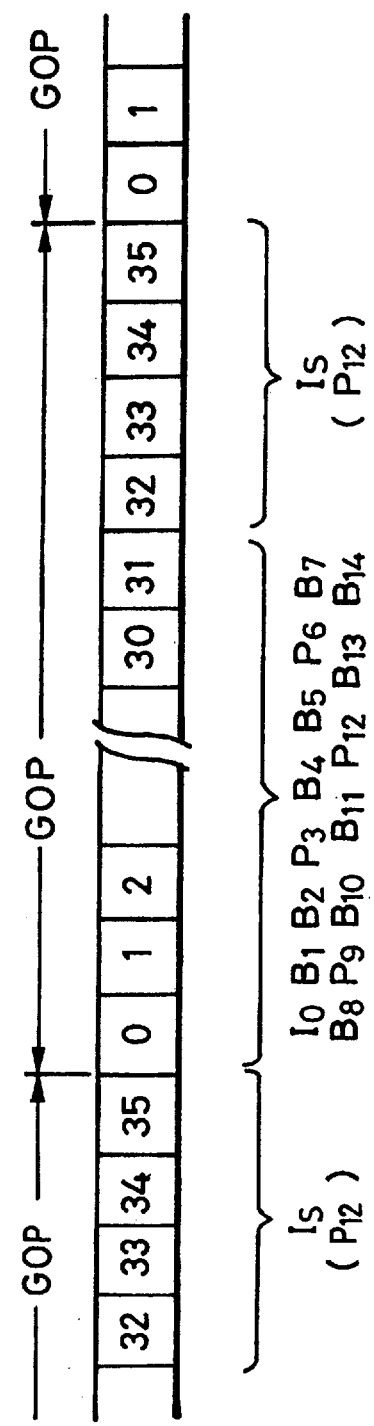
FIG. 12 is a conceptual diagram used to explain another relationship between the group of picture and the cluster which are applied to the embodiment of the present invention.

FIGS. 11 and 12 show relationship between the GOP and the cluster according to another embodiment of the present invention. In this embodiment, as shown in FIG. 11, for example, 15 frames constitute 1GOP. Of sequentially input frames, image of 3rd frame is set to I picture I0, image of 6th frame is set to P picture P3 which is a forward predictive-coded picture from the picture I0 of 3rd frame, and image of 9th frame is set to P picture P6 which is a forward predictive-coded picture from the picture P3 of 6th frame. Image of 12th frame is set to P picture P9 which is a forward predictive-coded picture from the picture P6 of 9th frame. Image of last 15th frame is set to P picture P12 which is a forward predictive-coded picture from the P picture P9 of 12th frame.

Images of each frame located between the I picture and the P picture is set to B pictures. Images of the 4th and 5th frames are set to B pictures B4, B5 which are bidirectionally predictive-coded pictures of the I picture I0 of 3rd frame and the P picture P3 of the 6th frame. Image of the 7th and 8th frames are set to B pictures B7, B8 from P pictures P3 and P6 of the 6th and 9th frames. Images of the 10th and 11th frames are set to B pictures B10, B11 from P pictures P6 and P9 of the 9th and 12th frames. Further, images of the 13th and 14th frames are set to B pictures B13, B14 from P pictures P9 and P12 of the 12th and 15th frames.

Images of the first 2 frames of the GOP are set to B pictures B1, B2 from the last P picture P12 of the immediately-preceding GOP and the I picture I0 of the corresponding GOP.

If however the GOP is arranged as described above, then when only the cluster corresponding to the same GOP is reproduced, the B pictures B1, B2 of the first 2 frames cannot be reproduced. The reason for this is that the P picture which is the picture used as the reference picture to predict the B pictures B1, B2 belongs to the immediately-preceding GOP and recorded on the immediately-preceding cluster.

Therefore, according to this embodiment, as shown in FIG. 12, the coded video data of 15 frames composing the GOP are disposed in the first 32 sectors within 36 sectors composing 1 cluster in the sequential order of being encoded. Moreover, the coded video data of last 4 sectors corresponding to the P picture P12 which is an image used to predict the B pictures B1, B2 of the first 2 frames of the immediately-succeeding GOP is recorded as I picture Is which is encoded by an intra-picture coding method such that an image can be re-constructed only by its data without using prediction. It is natural that the I picture Is should overlap the P picture P12 provided with the same cluster and become redundant data.

If however such redundant I picture Is is recorded, then it becomes possible to decode the original picture only from the coded video data of the last 4 sectors of the GOP. Specifically, all GOPs within the immediately-preceding cluster need not be decoded from the beginning. Therefore, it becomes possible to decode the sandwiched B pictures B1, B2 from the I picture Is of the last 4 sectors of the immediately-preceding GOP of the GOP to be reproduced and the 3rd I picture I0 of the GOP to be reproduced.

However, in the case of the recordable mini disc 1a (referred to hereinafter as MO cluster including the writable area of the partial ROM disc), 3 sectors of the last 4 sectors of each cluster should be maintained as the link sector according to the standard. However, in the case of the preformatted mini disc 1a (referred to hereinafter as ROM cluster including a preformatted area of the partial ROM disc), it is possible to freely utilize these 4 sectors as sub-data sectors fully. In the case of the preformatted mini disc 1a, a predictive-coded picture of the B pictures B1, B2 of the first 2 frames of the immediately-succeeding GOP is recorded on the sub-data sectors of the last 4 sectors of each cluster (sub-data sector and link sector are referred to collectively as link sector in this specification) as the I picture Is.

Figure 13:
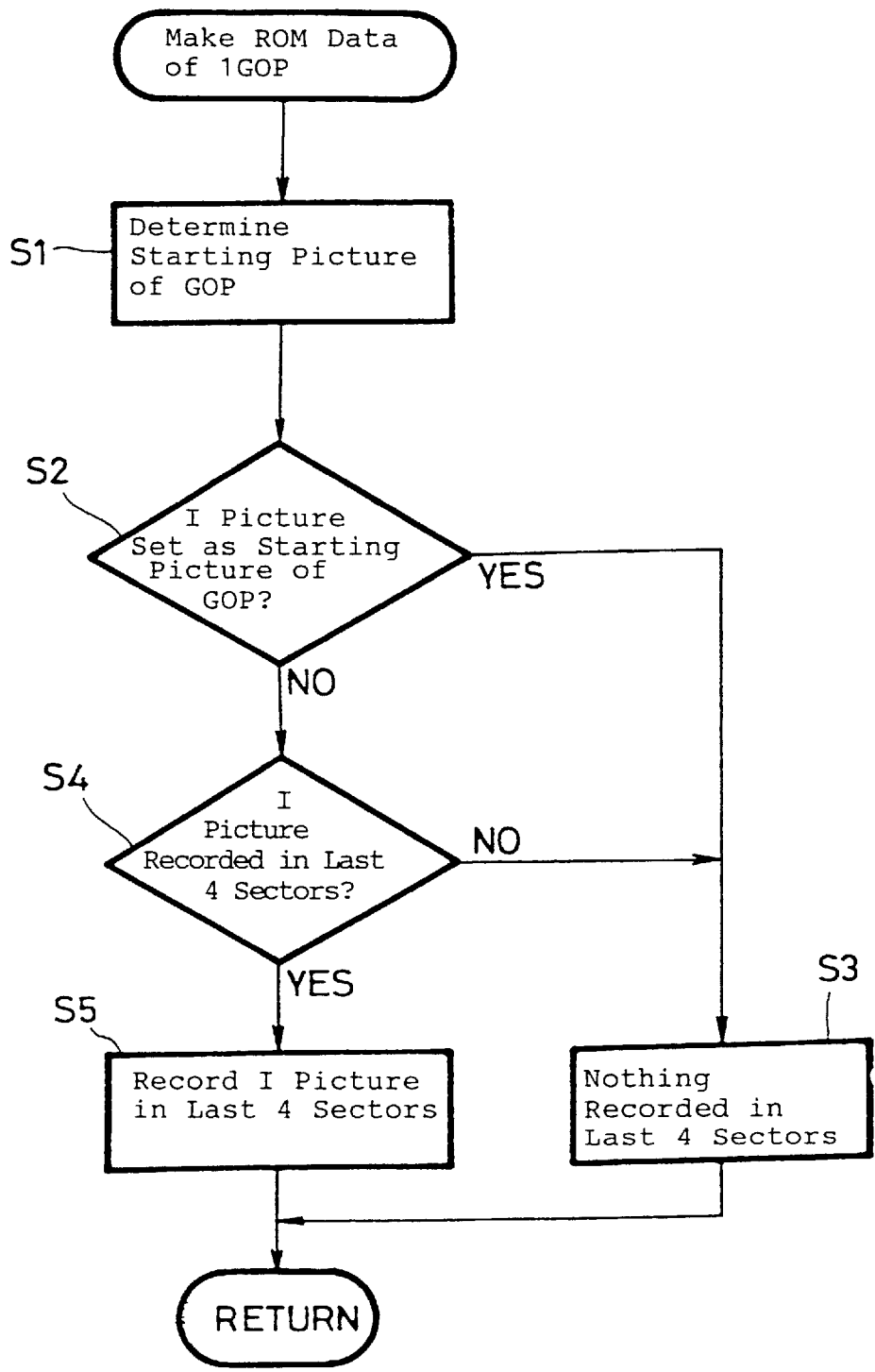
FIG. 13 is a flowchart showing how to make data of one group of picture for a preformatted mini disc according to the embodiment of the present invention.

FIG. 13 is a flowchart showing how to make data of 1 group of picture relative to the preformatted mini disc 1a (ROM cluster) according to the embodiment of the present invention.

As illustrated, in this case, the ROM cluster includes a partial ROM in which not only the whole of the disc is used as a ROM area but also a predetermined area of an inner periphery of one disc is set to a ROM cluster and a predetermined area of an outer peripheral portion is set to a recordable MO cluster.

In step S1 in FIG. 13, assuming the cluster to be recorded is a ROM cluster, then a picture type of a starting frame of the GOP is determined. When the GOP to be recorded is of the type such that the starting frame is set to the I picture as shown in FIG. 10, for example, the processing proceeds from the next step S2 to step S3, whereat no data is recorded on the last 4 sectors (data is, however, recorded so as to complete interleaving in actual practice). Then, the processing is ended.

On the other hand, in step S1, when the starting frame is composed of the B picture or P picture other than the I picture as shown in FIG. 11, for example, the processing proceeds from the next step S2 to step S4, whereat it is determined whether or not the I picture Is (predictive picture of the first 2 frames of the immediately-succeeding GOP) corresponding to the P picture P12 is of a capacity that can be recorded in the last 4 sectors of the cluster.

If it is determined that the picture is of the capacity that can be recorded, then the processing proceeds to step S5, whereat this I picture Is is recorded. On the other hand, if it is determined that the data amount of the I picture Is is so large that data of the I picture Is cannot be recorded in the 4 sectors, then the processing proceeds to step S3, whereat the I picture Is is not recorded.

Considering the last 4 sectors of the cluster and the data amount of I picture Is, data is encoded and recorded in order to obtain a picture of high picture quality by using algorithm utilizing a GOP which is provided as immediately-preceding as possible.

Figure 14:
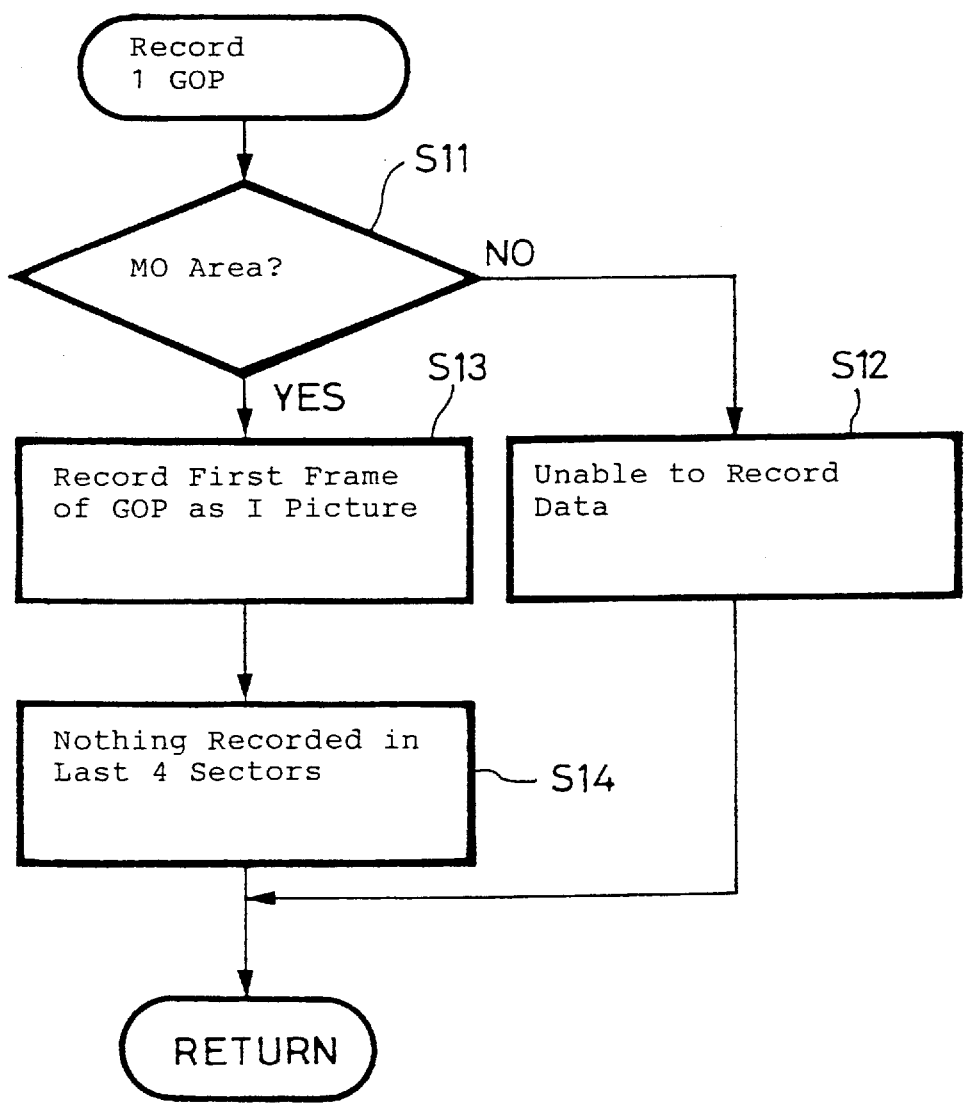
FIG. 14 is a flowchart showing how to make data of one group of picture for a recordable mini disc according to the embodiment of the present invention.

FIG. 14 is a flowchart showing how to record data of one group of picture on the recordable mini disc according to the embodiment of the present invention. In step S11 in the figure, if it is determined that the cluster to be recorded is the MO cluster, then the link sector formed of 3 sectors has to be maintained in the last 4 sectors of each cluster according to the MPEG standard {see specifications of Japanese patent application No. 2-222821 (Japanese laid-open patent publication No. 4-105271) and corresponding U.S. Pat. No. 5,243,588}. Accordingly, in this case, the processing proceeds to step S13, whereat the starting frame of GOP is set to an I picture and the last frame is set to a P picture on the assumption that the predicting processing from the immediately-preceding GOP is impossible. Then, the processing proceeds to step S14, whereat data is not recorded on the last 4 sectors of the cluster. Thus, the coded video data is recorded according to the format of the embodiment shown in FIGS. 9 and 10.

Figure 15:
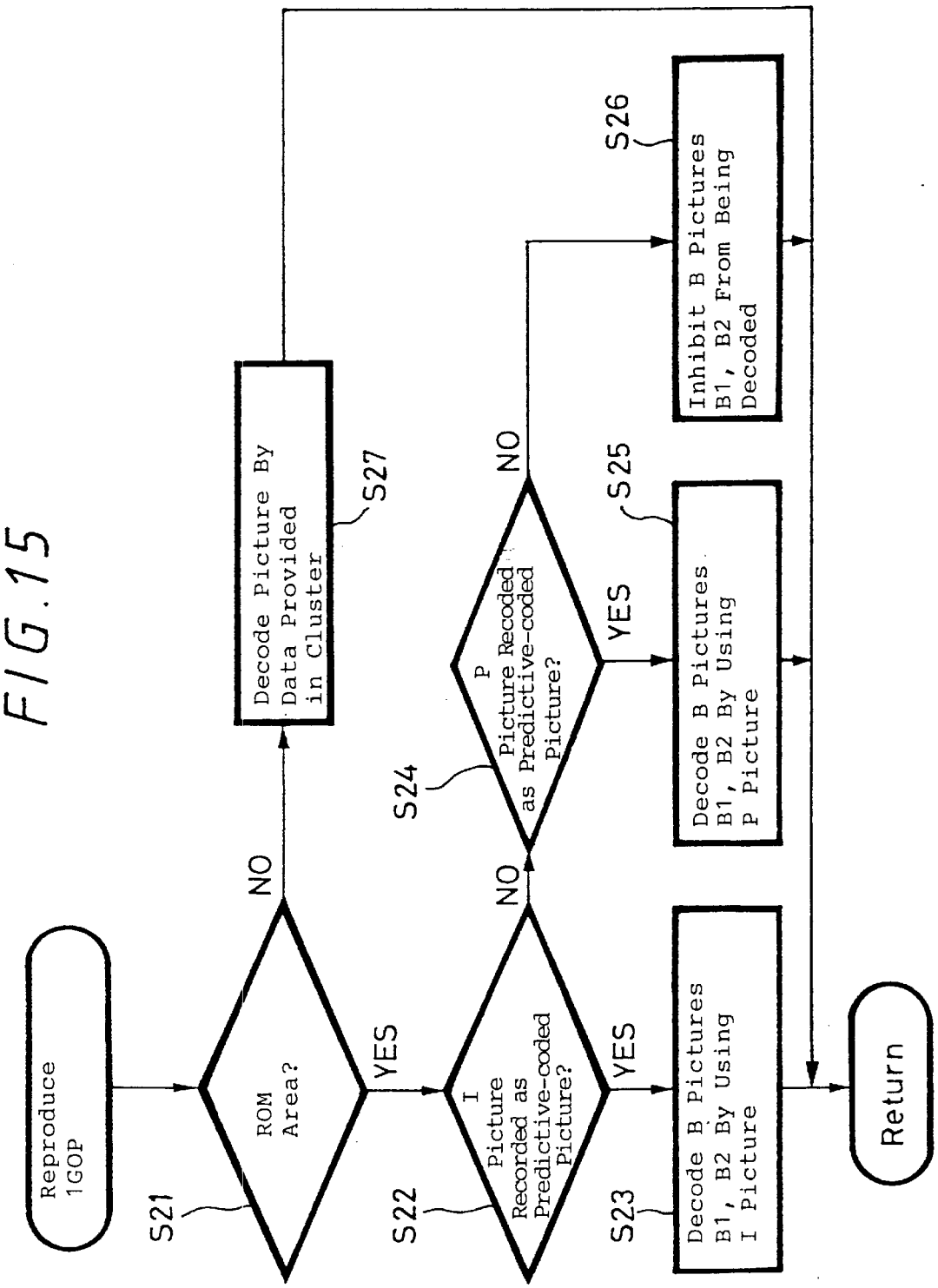
FIG. 15 is a flowchart showing how to play back data of one group of picture from a mini disc 1a according to the embodiment of the present invention.
Figure 16:
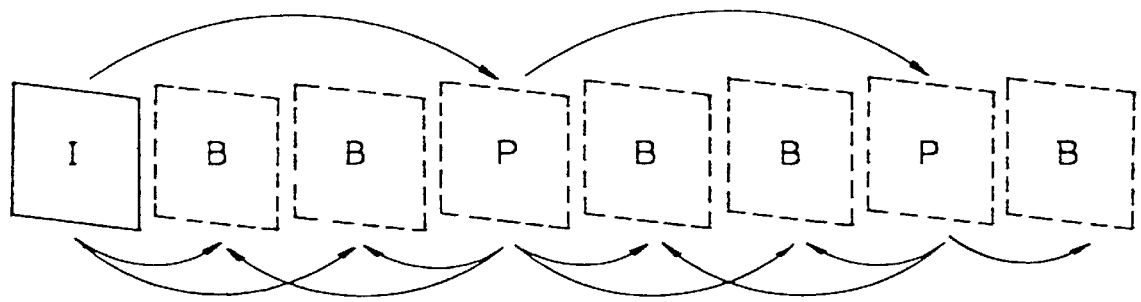
FIG. 16 is a diagram showing a prediction among pictures.
Figure 17:
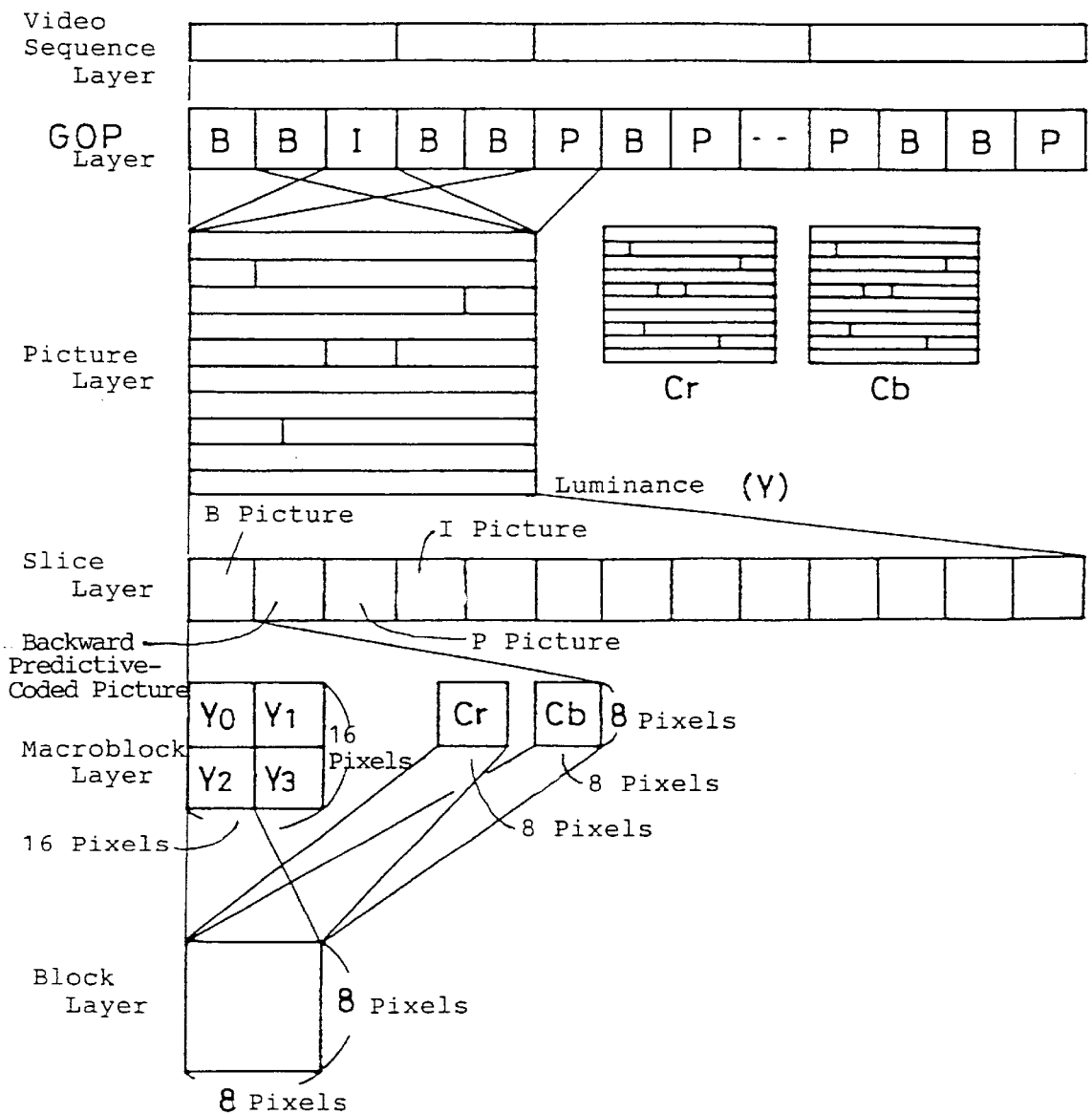
FIG. 17 is a diagram showing a data structure.

FIG. 15 is a flowchart showing how to reproduce video data of one group of picture amount from the mini disc 1a according to the embodiment of the present invention.

Initially, in step S21, it is determined whether or not the cluster to be reproduced is the ROM cluster. If it is determined that the cluster to be reproduced is the ROM cluster, then the processing proceeds to step S22, whereat it is determined whether or not I picture Is is recorded on the last 4 sectors of the immediately-preceding cluster. If it is determined that the I picture Is is recorded, then the processing proceeds to step S23, wherein B pictures $B_1$, $B_2$ of the starting 2 frames of the next GOP are decoded by using the I picture Is.

If it is determined in step S22 that the I picture Is is not recorded on the last 4 sectors of the cluster, then the processing proceeds to step S24, whereat it is determined whether or not there exists data (data of I picture) which results from decoding a picture $P_{12}$ of the immediately-preceding GOP. When the search, for example, is carried out, the cluster is not always decoded from the first sector of all sectors in the immediately-preceding GOP. In this case, it is frequently observed that the P picture $P_{12}$ is not decoded. Accordingly, in this case, the processing proceeds to step S26, whereat the B pictures $B_1$, $B_2$ of the starting 2 frames of the GOP are not decoded substantially (even if they are decoded, decoded data should not be displayed). Thus, it is possible to prevent a disturbed picture from being displayed.

On the other hand, when the search is not carried out but the normal reproduction is carried out, the clusters are sequentially reproduced. Thus, in step S24, it is determined that the P picture $P_{12}$ of the immediately-preceding GOP is decoded. In this case, the processing proceeds from step S24 to step S25, whereat the B pictures $B_1$, $B_2$ of the first frame of the next GOP are decoded by using the decoded P picture $P_{12}$.

If on the other hand it is determined in step S21 that the cluster to be reproduced is not the ROM cluster (if it is determined that the cluster to be reproduced is the MO cluster), then the processing proceeds from step S21 to step S27, whereat only the data provided within the cluster to be reproduced is decoded. Specifically, in this case, as earlier described in step S2 in FIG. 13, the I picture is disposed on the starting portion of the cluster and the P picture is disposed at the ending portion of the cluster. As a result, only the data provided within the cluster can be decoded.

While the MPEG digital compressed video data is recorded on the mini disc as described above, the present invention can be applied to the case that digital video data processed by other compression system is recorded on other disc.

As set forth, according to the disc-shaped recording medium, the disc recording apparatus and the disc reproducing apparatus of the present invention, since the high-efficiency coded digital image data is recorded on each cluster at the unit of one group of picture, an edit processing and special reproduction, such as high-speed feed forward and reverse reproduction based on the GOP unit become possible. Thus, it is possible to prevent a picture from being interrupted upon special playback.

Further, when the disc-shaped recording medium is such one that can only be reproduced and the forward predictive-coded picture or bidirectionally predictive-coded picture exists at the starting portion of the cluster, it becomes possible to reproduce a picture of high picture quality at high speed by encoding and recording a picture, which becomes a predictive standard of the forward predictive-coded picture or the bidirectionally predictive-coded picture, on the link sector of the immediately-preceding cluster as an intra-coded picture.

Furthermore, when the forward-predictive-coded picture or the bidirectionally predictive-coded picture exists on the starting portion of the cluster, if it is determined that the picture, which becomes a predictive standard of the forward predictive-coded picture or the bidirectionally predictive-coded picture, is not coded as the intra-coded picture and is not recorded on the link sector of the immediately-preceding cluster, then it is possible to prevent a picture quality of a reproduced picture from being degraded due to disorder of picture by substantially inhibiting the forward predictive-coded picture or the bidirectionally predictive-coded picture recorded at the starting portion of the cluster from being decoded.

I claim:

1. A recording apparatus for recording encoded interleaved video data on a recording medium divided into a plurality of clusters, each cluster including plural sectors, said apparatus comprising:

means for receiving video data;

encoding means for compressing said video data using frame correlation over a plurality of frames to form groups of pictures; and recording means for recording compressed interleaved video data in a group of pictures in less than all of the sectors included in a respective cluster of said recording medium, thereby producing a link area of said cluster in which the interleaved video data of said group of pictures is not recorded.

2. A recording apparatus according to claim 1, wherein said group of pictures includes intra-frame predictive and inter-frame predictive encoded pictures, and wherein said recording means includes means for determining when an inter-frame predictive encoded picture is located at a start position of a cluster and means for recording an intra-frame predictive encoded picture in said link area to be used to decode said inter-frame predictive encoded picture in said start position of said cluster.

3. A reproducing apparatus for reproducing interleaved encoded video data from a recording medium, said recording medium being divided into clusters, each cluster including plural sectors, and the encoded video data being recorded in a cluster as a group of pictures containing intra-frame and inter-frame predictive encoded pictures, said reproducing apparatus comprising:

reproducing means for reproducing said encoded video data from said recording medium;

detecting means for detecting a picture type of a picture of said reproduced data at a start position of said cluster; and means for decoding said reproduced data;

wherein said reproducing means includes means for recovering a complete group of pictures from less than all the sectors included in a respective cluster when said picture type is detected as said intra-frame predictive encoded picture whereby the remaining sectors of said cluster form a link area which does not contain said interleaved encoded video data.

4. A reproducing apparatus according to claim 3, wherein when said picture type is detected as said inter-frame predictive encoded picture, said reproducing means reproduces said inter-frame predictive encoded picture in said start position as a function of an intra-frame predictive encoded picture stored in said link area of the immediately preceding cluster, and said reproducing means further includes means for inhibiting the reproduction of said predictive picture in said start position when no intra-frame predictive encoded data is stored in said link area.

5. A reproducing apparatus according to claim 4, wherein said reproducing means additionally includes means for using decoded data from a preceding cluster to enable the decoding of said inter-frame predictive encoded picture at said start position of the present cluster even if no picture data is stored in said link area.

6. A recording medium divided into a plurality of clusters, each cluster including plural sectors, and encoded interleaved video data being recorded in a cluster as a group of pictures in less than all of the sectors included in a respective cluster of said recording medium, thereby producing a link area of said cluster in which the interleaved encoded video data of said group of pictures is not recorded.

7. A recording medium according to claim 6, wherein said group of pictures contains at least one intra-frame predictive picture and at least one inter-frame predictive encoded picture, and wherein when said inter-frame predictive encoded picture is located at a start position of said cluster, an intra-frame predictive encoded picture is located in the link area of a cluster and when said intra-frame predictive encoded picture is located at said start position of a cluster, the link area does not contain interleaved encoded video data.

* * * * *